United States Patent [19]
Seitz

[11] Patent Number: 5,872,601
[45] Date of Patent: Feb. 16, 1999

[54] CIRCUIT ARRANGEMENT FOR AUTOMATICALLY RECOGNIZING THE LINE STANDARD OF A VIDEO SYNC SIGNAL

[75] Inventor: Martin Seitz, Ober-Ramstadt, Germany

[73] Assignee: U.S. Philips Corporation, New York, N.Y.

[21] Appl. No.: 753,590

[22] Filed: Nov. 26, 1996

[30] Foreign Application Priority Data

Dec. 1, 1995 [DE] Germany .................. 195 44 902.9

[51] Int. Cl.⁶ .................................................. H04N 5/46
[52] U.S. Cl. .......................... 348/558; 348/543; 348/548
[58] Field of Search .................................. 348/530, 558, 348/521, 524, 722, 554, 555, 556, 540, 542, 543, 544, 545, 546, 547, 548; H04N 5/05

[56] References Cited

U.S. PATENT DOCUMENTS

| | | | |
|---|---|---|---|
| 4,402,011 | 8/1983 | Newton | 358/154 |
| 4,821,112 | 4/1989 | Sakamoto et al. | 358/17 |
| 4,860,098 | 8/1989 | Murphy | 358/139 |
| 4,985,770 | 1/1991 | Nagashima et al. | 358/152 |
| 5,111,160 | 5/1992 | Hershberger | 331/1 A |

*Primary Examiner*—Michael Lee
*Attorney, Agent, or Firm*—Edward W. Goodman; Michael E. Belk; Gregory L. Thorne

[57] ABSTRACT

A circuit arrangement for automatically recognizing the line number of a video sync signal in accordance with the 525 or 625 line standard, this circuit arrangement automatically generating a control signal corresponding to one of the relevant line numbers. To recognize the line number, a line counter (14) clocked with horizontal frequency pulses is provided, this line counter receiving the frame-frequency sync pulse signal as a reset signal. Moreover, a decoding stage (15) is arranged at the output of the line counter (14), which supplies a signal for changing the line standard hitherto used and a signal characterizing the corresponding line standard. In a subsequent signal evaluation circuit (16), these two signals are checked and a control signal either corresponding to the current line standard or to the new line standard is applied to the output (17).

10 Claims, 2 Drawing Sheets

CIRCUIT ARRANGEMENT FOR AUTOMATICALLY RECOGNIZING THE LINE STANDARD OF A VIDEO SYNC SIGNAL

BACKGROUND OF THE INVENTION

1. Field of the Invention

The invention relates to a circuit arrangement for automatically recognizing the line number of a video sync signal in accordance with the 525 or 625 line standard, and for automatically generating a control signal corresponding to one of the relevant line numbers, a sync pulse signal of the horizontal frequency being derived from a main sync pulse generator via a phase-locked loop with a programmable divider arranged in the feedback path of the phase-locked loop.

2. Description Of The Related Art

The currently conventional color television systems make worldwide use of mainly two different line standards, namely, 525 lines at 30 (or 29.97) Hz frame frequency and 625 lines at 25 Hz frame frequency. Post-production television studios generally use the same television equipment, such as telecine scanners, video recorders, color correction apparatus, video mixers, etc., in the different color television standards, i.e., both 525 and 625 lines. To prevent that all television apparatuses connected to the main sync pulse generator of the television studio must be individually switched over when changing the line number, it is desirable to change only the line number when the sync pulses are generated, thus to switch the main sync pulse generator so that all television apparatuses synchronized therewith are simultaneously and automatically adapted to the new line number. To avoid picture drop-outs, a high degree of freedom from interference is required.

A circuit for automatically recognizing different line standards (525/625 lines) is known from U.S. Pat. No. 4,402,011, which circuit is, however, particularly intended for television receivers for domestic use. In this case, only a simple horizontal frequency oscillator having a fixed setting is provided as a sync generator for a line counter.

SUMMARY OF THE INVENTION

In contrast, it is an object of the present invention to provide a circuit arrangement of the type described in the opening paragraph, which is particularly suitable for television apparatus in television studios and in which the horizontal frequency derived from a clock tracked in frequency is allowed to deviate by a defined amount from the nominal value.

According to the invention, this object is solved in that a line counter is provided which is clocked with the horizontal frequency sync pulse signal derived from the phase-locked loop, and is reset with the frame-frequency sync pulse signal, in that the outputs of the line counter are connected to a decoding stage which, on the one hand, supplies a signal indicating either the maintenance or the change of the current line standard and, on the other hand, supplies a signal characterizing the new line standard after a change has been realized, and in that a signal evaluation circuit connected to the outputs of the decoding stage is provided, this evaluation circuit supplying a control signal corresponding to the line standard hitherto used or to the new line standard after a change has been recognized.

The circuit arrangement according to the invention has the advantage that a high degree of freedom from interference of the television apparatuses connected to the sync pulse generator is achieved. This is very important in studio operations, particularly also in television apparatuses used for post-production operation, because a line standard switch caused by possible interference would lead to staggering production costs, which would not be accepted by the users. Moreover, the circuit arrangement according to the invention has a small number of components because the circuit parts already present in a genlock of television apparatuses, such as pixel counters and line counters, are also used for the circuit arrangement according to the invention.

It is particularly advantageous that, after recognition of a change, the control signal corresponding to the new line standard is not supplied by the signal evaluation circuit until after an extensive plausibility test.

These and other aspects of the invention will be apparent from and elucidated with reference to the embodiments described hereinafter.

DESCRIPTION OF THE PREFERRED EMBODIMENTS

Figure 1:
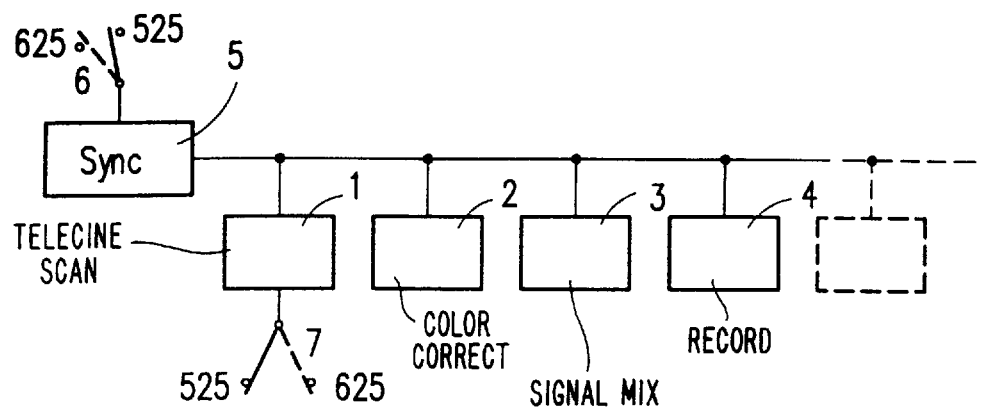
FIG. 1 is a block diagram of television apparatuses arranged in a television production studio.

FIG. 1 shows a plurality of television apparatuses which are generally present in a television production studio, such as telecine scanners 1, color correction apparatuses 2, video signal mixers 3, video recorders 4, all of which are fed with television sync signals by a main sync pulse generator 5. This generator 5 is switchable for the different color television systems between the two line standards of 525 lines and 625 lines by means of a switch 6. Hitherto, all operative television apparatuses connected to the generator 5 had to be individually switched to the selected line standard. Now, this switch is performed fully automatically by means of the circuit arrangements according to the invention, provided in each of these apparatuses 1 to 4. If a sync signal drops out, a further line standard switch 7 is provided for safety's sake at the telecine scanner 1.

Figure 2:
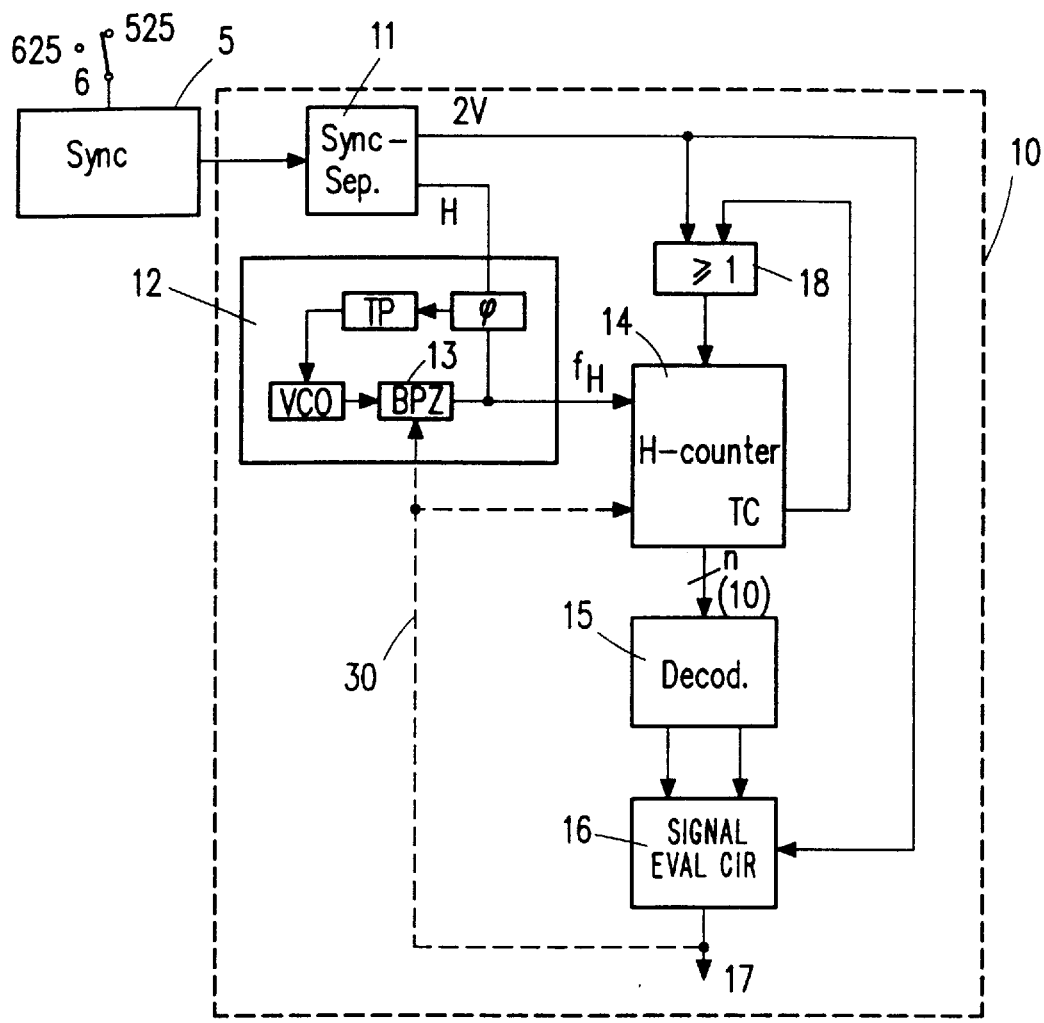
FIG. 2 is a block diagram of the circuit arrangement according to the invention.

FIG. 2 shows the block diagram of a circuit arrangement 10 for recognizing the line number according to the invention, this circuit arrangement being connected to the main sync pulse generator 5. This circuit arrangement consists of a circuit 11 for sync pulse signal separation having outputs from which a horizontal frequency sync pulse signal H and a frame-frequency sync pulse signal 2V can be supplied. The horizontal frequency sync pulse signal H is applied to a phase-locked loop 12 having a pixel counter as a programmable divider 13 in its feedback path. The phase-locked loop 12 supplies a horizontal frequency pulse signal $f_H$ as a clock signal for a line counter 14, so that each line is associated with a given count. Moreover, the line counter 14 receives a 2V pulse for resetting the counter to a defined initial value. This initial value is dependent on the relevant television standard (525 or 625 lines) and is chosen to be such that, before resetting, the count is equal for all standards. If an up-counter is used, this means that all bits are equal to 1, whereas all bits are equal to 0 if a down-counter is used. If this final state is reached, the counter itself also generates a reset signal which is conventionally referred to as TC (Terminal Count). The n-bit wide output signal (here n=10) of the line counter 14 is then applied to a decoding stage 15.

Since—as explained above—the horizontal frequency clock signal $f_H$ applied to the line counter 14 is taken from an oscillator VCO arranged in the phase-locked loop 12 and coupled to the external H signal, the phase-locked loop 12 may still be unsynchronized in the case of a change of the H signal serving as a reference signal, so that the clock signal $f_H$ has a frequency deviation with respect to the actual horizontal frequency. Consequently, the decoding stage 15 should tolerate small deviations from theoretical values, i.e., sampled values around zero should thus not trigger a change of the line standard.

For the use, described hereinafter, of a down-counter, the count before the next reset pulse is 0 when the internal mode of the circuit arrangement, according to the invention, corresponds to the standard of the applied synchronizing signal. For the case where the internal mode has 625 lines, but the applied synchronizing signal has 525 lines, the count is approximately 100 at the next reset pulse. In the reverse case, when the internal mode has 525 lines but the applied signal 625 lines, the line counter 14 reaches the position 0 already before the next reset pulse and is thus internally reloaded with TC. The count at the next external load pulse is thus approximately 425.

In order to determine whether a change of the line standard must be performed, the counts applied to the decoding stage 15 are checked before resetting, for which the following indicators, which can easily be evaluated, may be used.

Figure 3:
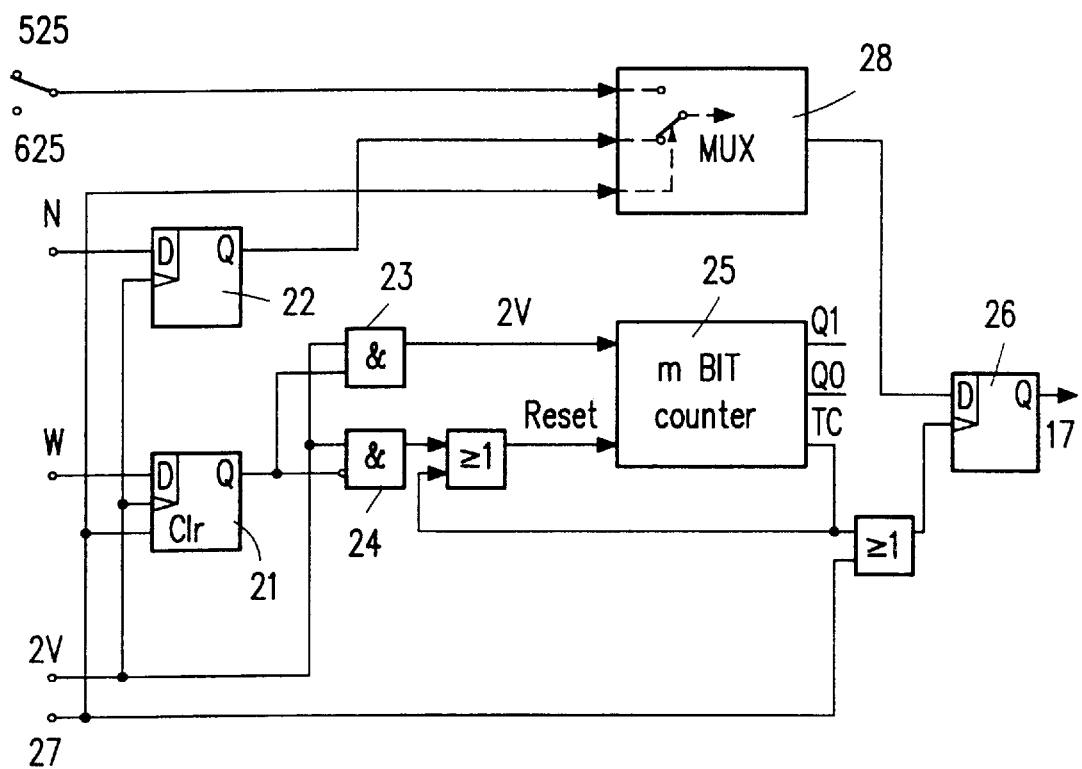
FIG. 3 is a block diagram of a signal evaluation circuit according to the invention.

If either bit 5 and bit 6 are equal to 0, or bit 9 is equal to 1 and bit 8 is equal to 0, the right mode is selected, or else the mode must be set again. The result of this check can be taken from an output of the decoding stage 15 as a signal level 0 or 1 for maintaining or changing the line standard. If a change of the line standard has been ascertained, the bit 8 is checked on fixing the line standard to be set, at which the 525 line mode is set when bit 8 is equal to 0 at the instant of the external 2V reset pulse, whereas in the opposite case, the 625 line mode is selected when bit 8 is equal to 1 at this instant. This signal can be taken from the other output of the decoding stage 15. These two output signals are now applied to a signal evaluation circuit 16, as shown in FIG. 3, which has an output 17 from which finally a control signal, indicating the automatically set line standard, can be supplied, producing a signal at the level 0, for example, for the 525 line standard, and a signal at the level 1 for the 625 line standard. This control signal is then applied to software generating the line standard in each television apparatus.

FIG. 3 shows the signal evaluation circuit 16 of FIG. 2 in detail. A first D-register 21 clocked with frame-frequency pulses is provided, this register having a D-input receiving an output signal W from the decoding stage 15 indicating a possible change of the line standard. The D-input of a second D-register 22 also clocked with frame-frequency pulses receives the output signal N from the decoding stage 15 indicating the new line standard. The output of the first D-register 21 is connected to one input of an AND circuit 23 and to the inverting input of a further AND circuit 24, while the frame-frequency sync pulse signal is present at the other inputs of the AND circuits 23 and 24. Thus, a frame-frequency sync pulse is always generated at the output of the AND circuit 23 when the decoding stage 15 has applied a "change-of-standard" signal to the first D-register 21, this output signal being sampled with the leading edge of the frame-frequency pulse and stored in the D-register 21. Thus, when a signal indicating the change of the line standard has been generated, a frame-frequency pulse signal is supplied by the AND circuit 23, which signal is applied in the form of clock pulses to an m-bit counter 25. When the signal supplied by the decoding stage 15 indicates that the line standard should not be changed, then a reset pulse for the m bit counter 25 is generated by the AND circuit 24 at each frame-frequency pulse. In order that switching processes are not triggered by any interference of the sync signal, the switching condition should be fulfilled in a plurality of consecutive frames. The signal for changing the line standard should thus be equal to 1 for $2^m-1$ frames in succession in order that the m-bit counter 25 reaches its highest value and the signal TC generated by this counter becomes equal to 1. From this count, a clock pulse for a third D-register 26 is generated, which thereby stores the value of the standard recognition supplied by the second D-register 22. The desired control signal can then be taken from the output 17 of the third D-register 26.

In the case of a possible drop-out of the external sync signal, no frame-frequency pulses are supplied any longer. The m-bit counter 25 then no longer receives any clock pulses and the line standard recognized as the last standard remains stored. If a possibly unwanted change of the indicated line standard is to be certainly prevented when an external sync signal is applied again, a reset signal is applied to the reset input (Clear) of the first D-register 21 as long as the external sync signal is absent. To this end, a signal of the level 0 will be present at the input 27 when the sync signal is present, and a signal of the level 1 will be present when the sync signal has dropped out.

In a further embodiment of the invention, a multiplexer 28 is provided which receives the output signal from the second D-register 22 and a preset line standard such as, for example, provided at the telecine scanner 1. With the aid of the sync status signal present at the input 27 and being applied to the control input of the multiplexer 28, the multiplexer 28 can be switched between these two applied signals.

As already mentioned hereinbefore, the invention attaches great value to the failure tolerance. On the one hand, the other standard will not be recognized until after a given number of cycles (frames) in succession so as to trigger the switching process. On the other hand, additional attention has been paid to the fact that the horizontal frequency may deviate by a defined amount from the nominal value without the circuit arrangement becoming active. This is important, because, in studio equipment, the pixel clock, the horizontal frequency pulse, the vertical frequency pulse and the frame-frequency pulse are derived from the same oscillator by way of division. All these dividers should be differently programmed, dependent on the television standard. Thus, if the circuit arrangement is active in the relevant difference standard, all frequencies will deviate from the nominal value. In fact, as long as the false standard is indicated via the connection 30 shown in a broken line in FIGS. 2 and 3, not only the line counter 14 but also the pixel counter 13 operates with false values. The generated horizontal frequency $f_H$ consequently deviates from the nominal value so that the phase-locked loop cannot lock in. The synchronizing circuits cannot operate correctly again until after the switching operation has been performed.

I claim:

1. A circuit arrangement for automatically recognizing a number of lines in a frame of a video sync signal in accordance with a 525-line or 625-line standard, and for automatically generating a control signal corresponding to one of the line standards, a sync pulse signal of horizontal frequency of the video sync signal being derived from a main sync pulse generator via a phase-locked loop with a programmable divider arranged in the feedback of the phase-locked loop, wherein said circuit arrangement comprises:

- a line counter clocked with the horizontal frequency sync pulse signal derived from the phase-locked loop, said line counter receiving a frame-frequency sync pulse signal as a reset signal;
- a decoding stage connected to outputs of the line counter, said decoding stage supplying a signal indicating either maintaining or changing a current line standard and a signal characterizing a new line standard after a change has been realized; and
- a signal evaluation circuit connected to outputs of the decoding stage, said evaluation circuit supplying a control signal corresponding to a line standard previously used or the new line standard after a change has been recognized.

2. A circuit arrangement as claimed in claim 1, characterized in that, after recognizing a change, the signal evaluation circuit does not supply the control signal corresponding to the new line standard until after a plurality of frames.

3. A circuit arrangement as claimed in claim 1, characterized in that the signal evaluation circuit comprises an m-bit counter which receives a reset pulse at each frame-frequency sync pulse signal when the current line standard is maintained, and frame-frequency sync pulses are applied as clock pulses when the line standard is changed, said clock pulses having been generated during a plurality of frames in succession until the counter generates its own signal for resetting after $2^m-1$ frames.

4. A circuit arrangement as claimed in claim 1, characterized in that an output signal from the decoding stage indicating a possible change of the line standard is applied to a first D-register clocked with frame-frequency sync pulses, the output of the first D-register being connected to one input of an AND circuit, another input of said AND circuit receiving the frame-frequency sync pulse signal, said AND circuit generating frame-frequency clock pulses for an m-bit counter after a change of the line standard, and an output of the first D-register is connected to an inverting input of a further AND circuit, a non-inverting input of said further AND circuit receiving the frame-frequency sync pulse signal, said further AND circuit generating frame-frequency reset pulses when the line standard previously used is maintained.

5. A circuit arrangement as claimed in claim 4, characterized in that the output signal from the decoding stage characterizing the new line standard is applied to a second D-register clocked with frame-frequency sync pulses, an output of said second D-register being connected to an input of a third D-register clocked with the output pulses of the m-bit counter, while the control signal corresponding to the relevant line standard is supplied at an output of said third D-register.

6. A circuit arrangement as claimed in claim 4, characterized in that, in the absence of the sync signal, a sync status signal is applied as a reset signal to the first D-register.

7. A circuit arrangement as claimed in claim 1, characterized in that, in addition to the frame-frequency sync pulse signal, a reset signal generated by the line counter is applied as the reset signal to said line counter via a combinatorial circuit.

8. A circuit arrangement as claimed in claim 6, characterized in that the signal evaluation circuit comprises a multiplexer having a first input for receiving the output signal from the second D-register and a second input for receiving a signal corresponding to a preset line standard, the sync status signal generated in the absence of the sync signal being applied to a control input of the multiplexer.

9. A circuit arrangement as claimed in claim 1, characterized in that the control signal is applied as a standard status signal to the line counter as well as to the pixel counter.

10. A circuit arrangement for automatically recognizing a number of lines in a frame of a video sync signal in accordance with a 525-line or 625-line standard, and for automatically generating a control signal corresponding to one of the line standards, comprising:

- means for deriving a sync pulse signal of horizontal frequency of the video sync signal from a main sync pulse generator via a phase-locked loop with a programmable divider arranged in the feedback of the phase-locked loop;
- a line counter clocked with the horizontal frequency sync pulse signal derived from the phase-locked loop, and receiving a frame-frequency sync pulse signal as a reset signal;
- a decoding stage supplying a signal indicating either maintaining or changing a current line standard and a signal characterizing a new line standard after a change has been realized; and
- a signal evaluation circuit connected to outputs of the decoding stage and supplying a control signal corresponding to a line standard previously used or the new line standard after a change has been recognized.

* * * * *